United States Patent [19]

Kayashima et al.

[11] Patent Number: 5,522,308
[45] Date of Patent: Jun. 4, 1996

[54] GRIDDLE

[75] Inventors: Kazuhiro Kayashima; Hidetsugu Maekawa, both of Hirakata, Japan

[73] Assignee: Matsushita Electric Industrial Co., Ltd., Osaka, Japan

[21] Appl. No.: 311,757

[22] Filed: Sep. 23, 1994

[30] Foreign Application Priority Data

Sep. 29, 1993 [JP] Japan .................... 5-242448

[51] Int. Cl.⁶ .............. A47J 37/06; F27D 11/02
[52] U.S. Cl. .............. 99/331; 99/422; 219/436; 219/441; 219/442; 219/542
[58] Field of Search ............ 99/331–333, 422–425, 99/325, 326, 338, 330, 337; 219/436, 542, 461–465, 467, 476, 458, 540, 546, 548, 552, 457, 441, 442, 438, 411, 622, 626, 512, 466, 521; 392/435, 418

[56] References Cited

U.S. PATENT DOCUMENTS

| | | |
|---|---|---|
| 3,667,373 | 6/1972 | Sicher et al. . |
| 3,739,148 | 6/1973 | Ryckman, Jr. .................... 219/441 |
| 4,195,560 | 4/1980 | DuBois et al. .................... 99/422 |
| 4,245,613 | 1/1981 | Wells et al. . |
| 4,307,287 | 12/1981 | Weiss .................... 99/333 |
| 4,347,432 | 8/1982 | Gössler . |
| 4,447,691 | 5/1984 | Mizukawa et al. . |
| 4,554,437 | 11/1985 | Wagner et al. . |
| 4,584,850 | 4/1986 | Haltenhof .................... 66/75.1 |
| 4,951,648 | 8/1990 | Shukla et al. . |
| 5,227,610 | 7/1993 | Schultheis et al. .................... 219/449 |
| 5,413,032 | 5/1995 | Bruno et al. .................... 219/436 |

*Primary Examiner*—Timothy F. Simone
*Attorney, Agent, or Firm*—Beveridge, DeGrandi, Weilacher & Young

[57] ABSTRACT

The griddle of this invention includes a temperature adjustment element for adjusting a cooking temperature for a material such as meat and vegetable, a thin plate having a small heat capacity for heating the material, an adiabatic frame for supporting the thin plate with an adiabatic structure, a plurality of heating elements for heating the thin plate, a plurality of temperature sensors for measuring temperatures of a plurality of positions on the thin plate, and a power distribution element for determining power to be distributed to each of the heating elements based on the outputs from the temperature sensors and the cooking temperature.

15 Claims, 6 Drawing Sheets

GRIDDLE

BACKGROUND OF THE INVENTION

1. Field of the Invention

The present invention relates to a griddle useful for cooking grilled meat and steak at home.

2. Description of Related Art

A griddle has been used for enjoying grilled meat and steak among a small number of people, and is useful not only for enjoying the taste of the grilled meat and the like but also for the pleasures of a happy home.

Figure 11:
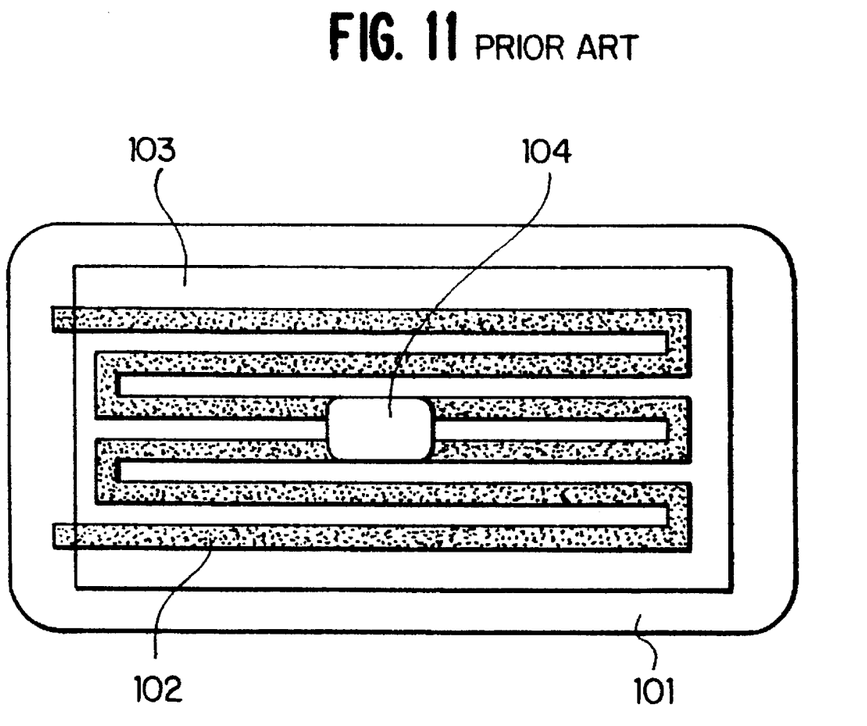
FIG. 11 is a schematic view of a conventional griddle.

FIG. 11 shows the configuration of a conventional griddle. The griddle comprises temperature adjustment means (not shown) for adjusting a cooking temperature for a material to be cooked such as meat and vegetables (hereinafter referred to as merely a material), an iron plate 101 with a thickness of several millimeters (mm), a heater 102 for heating the iron plate 101 through heat conduction, a heater container 103 for accommodating the heater 102, a temperature sensor 104 for measuring the temperature around the center of the iron plate 101, and control means (not shown) for controlling the temperature of the iron plate 101 so as to be maintained at the cooking temperature by using the heater 102 and the temperature sensor 104.

In such a conventional griddle, the iron plate 101 is subjected to auxiliary heating for a while to achieve a desired cooking temperature. Then, a material is placed around the center of the iron plate 101 to be grilled. Since the material is cool at this point, the temperature of the iron plate 101 can be decreased. The iron plate 101 and the heater container 103 of the conventional griddle, however, have a large heat capacity, and hence the temperature of the iron plate 101 is prevented from being largely decreased.

Because of the change of society such as the increasing number of dual-income families and the old, and the trend for pursuing a real stuff, cooking utensils are now required to satisfy the following demands (a) through (d):

(a) to require a shorter time for cooking;

(b) to be compact and light;

(c) to consume a small amount of electric power; and (d) to serve real cuisine.

The real cuisine cooked with a griddle herein indicates food that is generally cooked on a large and thick iron plate or a large hot pebble, the temperature of which is not decreased by placing a material.

In the conventional griddle, the auxiliary heating of the iron plate 101 takes a long time (approximately 10 minutes) because the iron plate 101 and the heater container 103 have a large heat capacity. Further, the conventional griddle is disadvantageously heavy.

In addition, even when the material is put on only a center part of the plate, the entire plate is heated. Therefore the heating of the portion excluding the place where the material is placed is wasted.

Furthermore, since the heat is wasted in this manner, the place where the material is placed cannot be sufficiently heated, resulting in decreasing the temperature of that place of the iron plate.

SUMMARY OF THE INVENTION

The first objective of the present invention is solving the above-mentioned problems and satisfying the demands (a) through (c).

In order to attain the first objective, the griddle of this invention comprises temperature adjustment means for adjusting a cooking temperature for a material such as meat and vegetables, a thin plate with a small heat capacity for heating the material through heat conduction, an adiabatic frame for supporting the thin plate with an adiabatic structure, heating means for heating the thin plate, a temperature sensor for measuring the temperature of the thin plate, and power control means for determining the quantity of power to be supplied to the heating means based on the output from the temperature sensor and the cooking temperature.

In the griddle having the above-mentioned structure, the thin plate with a small heat capacity that is thermally insulated by the adiabatic frame is used as a plate for placing a material. As the result, a time required for the auxiliary heating of the plate to attain a desired cooking temperature is short, total power consumed for cooking is small, and the weight of the griddle is decreased.

The second objective of the present invention is satisfying the demand (d) as well as the demands (a) through (c).

In order to attain the second objective, the griddle of this invention comprises temperature adjustment means for adjusting a cooking temperature for a material such as meat and vegetables, a thin plate with a small heat capacity for heating the material through heat conduction, an adiabatic frame for supporting the thin plate with an adiabatic structure, a plurality of heating means for heating the thin plate, a plurality of temperature sensors for respectively measuring the temperatures of a plurality of positions on the thin plate, and power distribution means for determining the quantity of power to be respectively supplied to the heating means based on the respective outputs from the temperature sensors and the cooking temperature.

In the griddle having the above-mentioned structure, a plurality of heating means and temperature sensors are provided so as to obtain a difference between a desired cooking temperature and the temperature at each of the respective positions. The position whose temperature is largely decreased from the desired cooking temperature is powerfully heated, thereby making the temperature decrease caused by placing the material on the plate as small as possible.

The third objective of the present invention is satisfying the demands (a) through (d), in particular the demands (c) and (d).

In order to attain the third objective, the griddle of this invention comprises temperature adjustment means for adjusting a cooking temperature for a material such as meat and vegetables, a thin plate with a small heat capacity for heating the material through heat conduction, an adiabatic frame for supporting the thin plate with an adiabatic structure, a plurality of heating means for heating the thin plate, a plurality of temperature sensors for respectively measuring the temperatures of a plurality of positions on the thin plate, and power distribution means, which includes a material identification circuit for detecting the presence of the material based on the quantity of previously supplied power and the temperatures of the respective positions on the thin plate. When the power distribution means detects the material placed on a certain area, the other areas excluding this area are not supplied with power.

In the griddle having the above-mentioned structure, the presence of a material is detected based on the quantity of previously supplied power and the temperatures of the respective positions on the plate. Heat is concentrated on the area where the material is placed alone and the other areas bearing no material are not heated, thereby making the temperature decrease caused by placing a material much smaller and decreasing the quantity of heat consumed for cooking.

The fourth objective of the present invention is satisfying the demands (a) through (d), in particular the demands (c) and (d) more effectively than in the griddle described with regard to the third objective.

In order to attain the fourth objective, the griddle of this invention comprises temperature adjustment means for adjusting a cooking temperature for a material such as meat and vegetables, a thin plate with a small heat capacity for heating the material through heat conduction, an adiabatic frame for supporting the thin plate with an adiabatic structure, a plurality of heating means for heating the thin plate, a plurality of temperature sensors for respectively measuring the temperatures of a plurality of positions on the thin plate, and power distribution means, which includes a heat capacity estimation circuit for estimating the heat capacity of the material based on the quantity of previously supplied power and the temperatures of the respective positions on the thin plate. The power distribution means distributes power to the respective heating means in proportion to the heat capacity of the material.

In the griddle having the above-mentioned structure, heat can be concentrated on a material having a large heat capacity, thereby making the temperature decrease caused by placing the material still smaller. Moreover, it is possible to adequately cook various materials having a different heat capacity.

DESCRIPTION OF THE PREFERRED EMBODIMENTS

The first example according to this invention will now be described referring to FIGS. 1 through 3.

Figure 1:
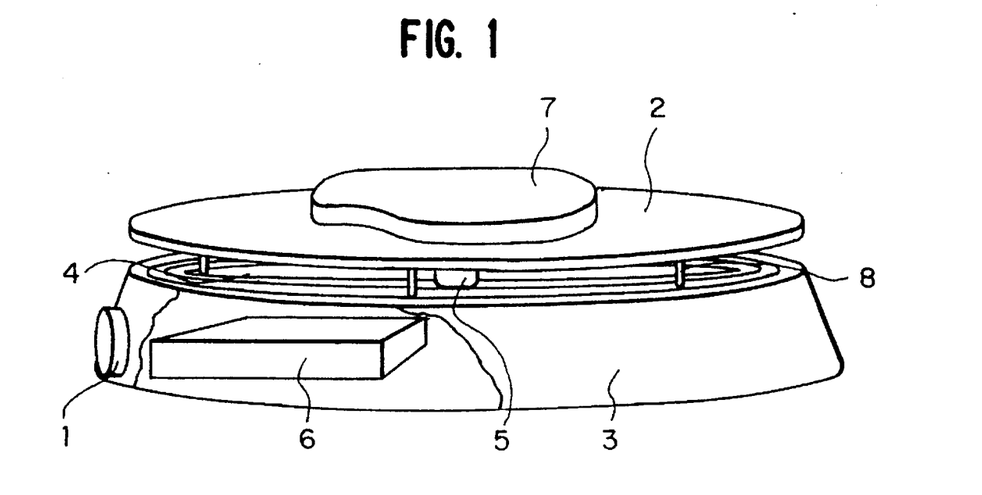
FIG. 1 is a perspective view of a griddle according to the first example of the present invention.

A griddle of this example comprises, as shown in FIG. 1, temperature adjustment means 1, a thin plate 2, an adiabatic frame 3, heating means 4, a temperature sensor 5 and power control means 6.

The temperature adjustment means 1 includes a control for adjusting an adequate cooking temperature for a material 7 such as meat and vegetables and outputs the cooking temperature to the power control means 6. The thin plate 2 for heating the material 7 through heat conduction is made of an iron plate with a thickness of 1 mm and has a small heat capacity. The adiabatic frame 3 for supporting the thin plate 2 with pins 8 has an adiabatic structure so as to prevent the heat of the thin plate 2 from being transferred. The heating means 4 electromagnetically heats the thin plate 2 by using an electromagnetic coil. The temperature sensor 5 is in contact with the thin plate 3 at the center thereof so as to measure the temperature of the thin plate 2. The temperature sensor 5 of this example is composed of a thermistor resistance and outputs the measured temperature to the power control means 6. The power control means 6 determines the quantity of power to be supplied to the heating means 4 based on the outputs from the temperature sensor 5 and the temperature adjustment means 1.

Figure 2:
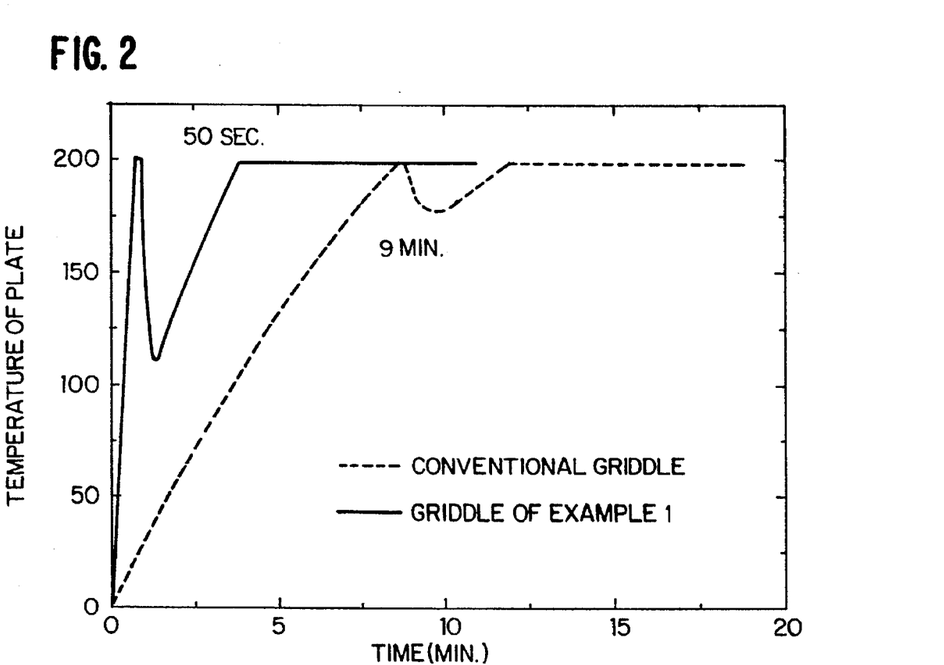
FIG. 2 is a graph showing the change with time in the temperature of a plate in the griddle of the first example.
Figure 3:
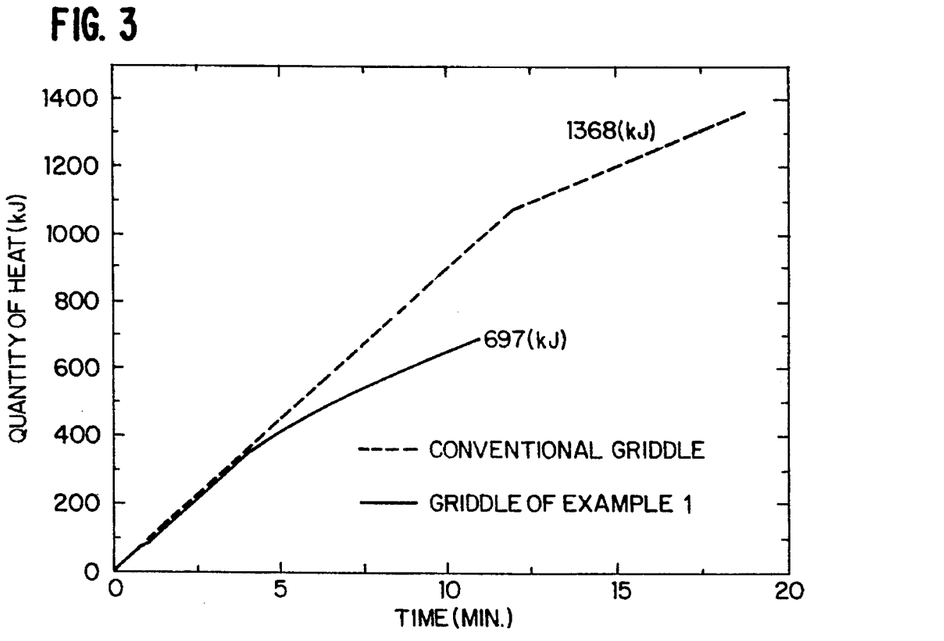
FIG. 3 is a graph showing the quantity of heat consumed in the griddle of the first example.

The griddle of this example and a conventional griddle will now be compared with each other referring to FIGS. 2 and 3, in which the data for the present griddle are shown with a solid line and those for the conventional griddle are shown with a dotted line. These graphs are obtained through thermal analysis calculating the following non-steady heat conduction equation 1 indicating the temperature of the plate and the consumed heat quantity in respective portions.

$$\kappa \frac{\partial}{\partial z} \frac{\partial}{\partial r} \frac{1}{r} \frac{\partial}{\partial r} T(r, z, t) + q(r, z, t) = \rho C \frac{\partial}{\partial t} T(r, z, t) \quad \text{Equation 1:}$$
(the inside of the plate)

$$hT(r, z_0, t) = -k \frac{d}{dz} T(r, z_0, t)$$
(the upper and lower surfaces)

$$hT(r_0, z, t) = -k \frac{d}{dr} T(r_0, z, t)$$
(the periphery)

The graphs of FIGS. 2 and 3 show the change in the temperature of the plate with time and the quantity of heat consumed with time, respectively. In the following description, the case where meat for steak is grilled with the respective griddles will be exemplified. First, a plate is subjected to auxiliary heating to attain a cooking temperature of 200 degrees, and 10 seconds after attaining the temperature stably, the meat is placed on the plate to be cooked for 10 minutes. The meat used has a thickness of 1 cm and a radius of 8 cm. The griddle of this example has maximum power Wmax of 1.5 kW, and includes a plate with a thickness of 1 mm and a radius of 16 cm. The conventional griddle is assumed to have a large heat capacity, having maximum power Wmax of 1.5 kW and including a plate with a thickness of 1 cm and a radius of 16 cm.

Each plate is subjected to the auxiliary heating before placing the meat. First, by the temperature adjustment means 1, the cooking temperature (hereinafter abridged as the temperature $T_{cook}$) is set at a temperature of 200 degrees. The power control mean 6 supplies power W to the heating means 4 by using the regulation of Equation 2 below in accordance with a difference between the cooking temperature $T_{cook}$ and the measured temperature $T_{measure}$ of the plate. Specifically, the power control means 6 first supplies maximum power Wmax to the heating means 4, and its control is switched to feedback control (i.e., control for not supplying the maximum power) when the measured temperature $T_{measure}$ approaches the cooking temperature $T_{cook}$, thereby maintaining the temperature of the plate at the cooking temperature $T_{cook}$. Then, the meat is placed on the plate to be cooked for 10 minutes.

$$W = \text{Min}(a(T_{cook} - T_{measure}), W_{max}) \quad \text{(when } T_{cook} > T_{measure}\text{)}$$
$$= 0 \quad \text{(when } T_{cook} \leq T_{measure}\text{)}$$

Equation 2:

wherein a has a proper value.

As is shown in FIG. 2, since the heat capacity of the thin plate 2 is small in the present griddle, the temperature on the thin plate 2 rises sharply. The rising time of the present griddle is only 50 seconds, which is 1/10 as short as that of the conventional griddle, where the rising time is approximately 9 minutes.

FIG. 3 shows the quantity of heat $\int Wdt$ consumed in cooking the meat in the above-mentioned manner. Since a small quantity of heat is used in the auxiliary heating in this example, only 697 kJ of heat is consumed to cook the meat. This is approximately half of 1368 kJ, that is, the quantity of heat consumed in the conventional griddle.

The second example of this invention will now be described referring to FIGS. 4 through 6.

Figure 4:
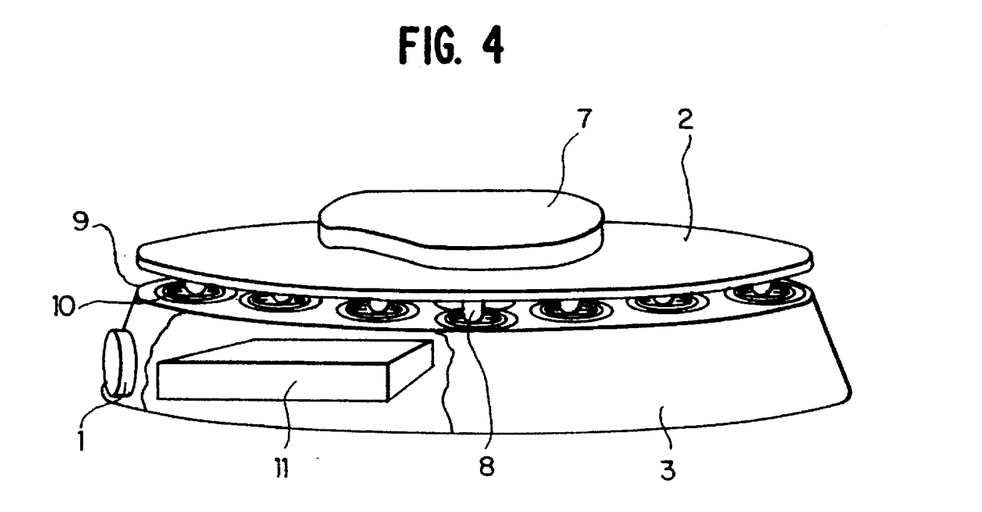
FIG. 4 is a perspective view of griddles according to the second and third examples of this invention.

A griddle of this example comprises, as shown in FIG. 4, temperature adjustment means 1, a thin plate 2, an adiabatic frame 3, a plurality of heating means 9, a plurality of temperature sensors 10 and power distribution means 11.

The temperature adjustment means 1 includes a control for adjusting an adequate cooking temperature for a material 7 such as meat and vegetables and outputs the cooking temperature to the power distribution means 11. The thin plate 2 for heating the material 7 through heat conduction is made of an iron plate with a thickness of 1 mm and has a small heat capacity. The adiabatic frame 3 for supporting the thin plate 2 with pins 8 has an adiabatic structure so as to prevent the heat of the thin plate 2 from being transferred. The plural heating means 9 electromagnetically heat the thin plate 2 at a plurality of positions, respectively by using electromagnetic coils. The plural temperature sensors 10 are respectively in contact with a plurality of positions on the thin plate 2, thereby measuring the temperatures of the respective positions. Each temperature sensor 2 of this example is composed of a thermistor resistance, and outputs the measured temperature to the power distribution means 11. The power distribution means 11 determines power to be distributed to each of the heating means 9 based on the outputs from the temperature sensors 3 and the temperature adjustment means 1.

Figure 5:
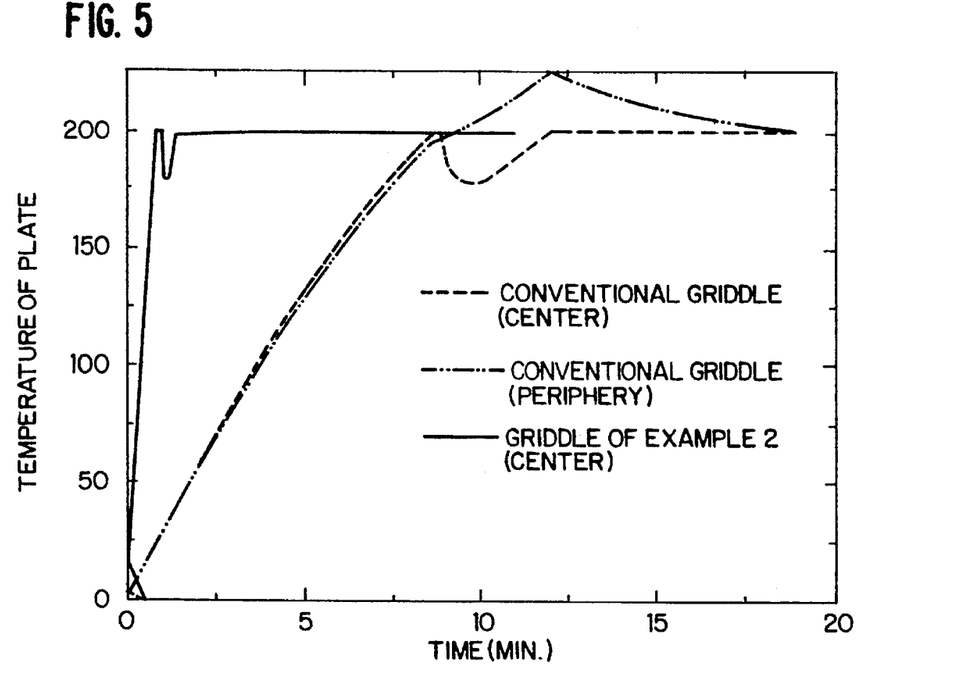
FIG. 5 is a graph showing the change with time in the temperature of a plate in the griddle of the second example.
Figure 6:
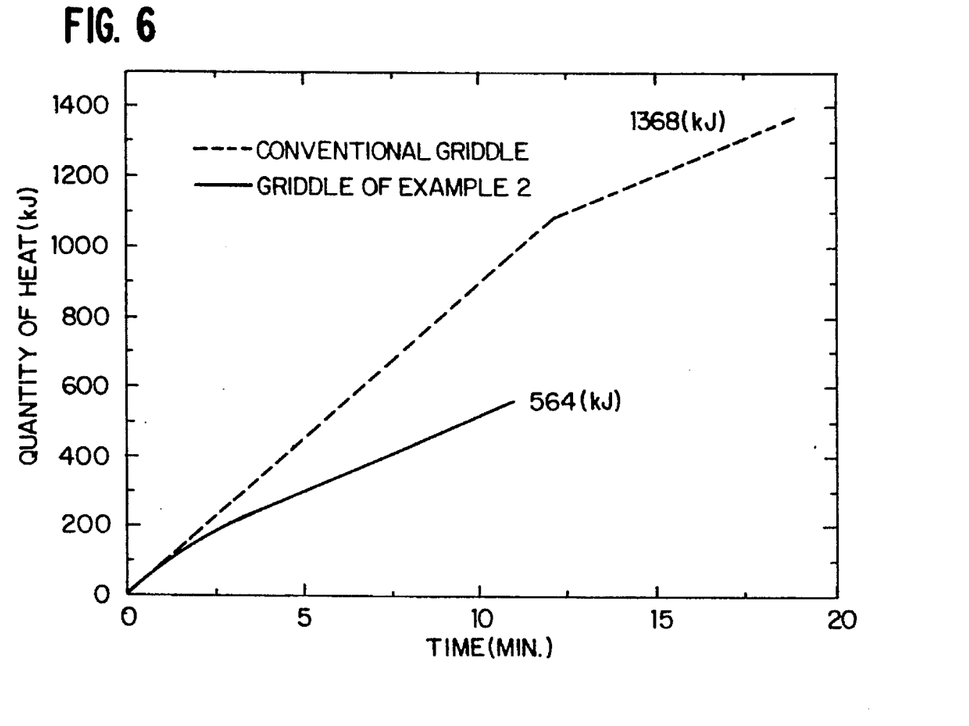
FIG. 6 is a graph showing the quantity of heat consumed in the griddle of the second example.

The griddle of this example and a conventional griddle will now be compared with each other referring to FIGS. 5 and 6, in which the data for the present griddle are shown with a solid line and those for the conventional griddle are shown with dotted lines. FIG. 5 shows the change with time in the temperature at the center or the periphery of the plate. FIG. 6 shows the quantity of heat consumed with time. The operation, the shape, and the maximum power of each griddle are the same as those in the first example.

Each plate is subjected to the auxiliary heating before placing the meat. First, by the temperature adjustment means 1, the cooking temperature is set at a temperature of 200!n (i.e., the temperature $T_{cook}$). The power distribution means 11 supplies distributed power W(i) to the respective heating means 9 by using the regulation of Equation 3 below.

$$W(i) = a(T_{cook} - T_{measure}(i)) \quad \text{(when } T_{cook} > T_{measure}(i)\text{)}$$
$$= 0 \quad \text{(when } T_{cook} \leq T_{measure}(i)\text{)}$$
If $(W_{total} = \Sigma_i W(i)) > W_{max}$, (a)

Equation 3:

perform a conversion of $W(i) = \dfrac{W_{max}}{W_{total}} W(i)$ (b)

wherein Wmax indicates the maximum power of the griddle; and a has a proper value.

Equation 3(a) indicates a power input distribution circuit for determining the distributed power W(i) to be supplied to each of the respective heating means 9 based on a difference between the cooking temperature $T_{cook}$ and each of the respective temperatures $T_{measure}$ at the respective positions on the plate. Equation 3(b) indicates a maximum power limit circuit for correcting the distributed power W(i) in accordance with the magnitude thereof when the total of the distributed powers W(i) to all the respective heating means 9 exceeds the maximum power Wmax.

The power distribution means 11 first supplies the maximum power Wmax so as to maximize the total power Wtotal of the distributed powers W(i) to all the respective heating means 9. When the temperatures of the respective positions on the thin plate 2 approach the cooking temperature $T_{cook}$, the control of the power distribution means 11 is switched to feedback control (i.e., control for not supplying the maximum power), thereby maintaining the temperatures $T_{measure}(i)$ in each of the respective positions at the cooking temperature $T_{cook}$. As is shown in FIG. 5, the temperature of the griddle of this example rises sharply. The rising time is only 50 seconds in the present griddle, which is 1/10 as short as that of the conventional griddle, where the rising time is approximately 9 minutes.

Then, meat, that is, a material 7, is placed on the thin plate 2. As shown in FIG. 5, the temperature around the center of the plate 2, where the meat is placed, is decreased both in the present griddle and the conventional griddle. At this point, power is supplied to the heating means 9 so as to raise the temperature of the thin plate 2. In the conventional griddle, however, the entire plate is heated, thereby raising the temperature of the periphery of the plate where the meat is not placed. This results in waste of heat and insufficient heating of the center of the plate where the meat is placed.

In the griddle of this example, since the center of the plate where the temperature is decreased is principally heated in accordance with Equation 3, and the thin plate 2 has a small heat capacity, the temperature at the center is rapidly raised up to the cooking temperature $T_{cook}$. This means that the temperature of the plate is controlled in the griddle of this example in the same manner as in the case where a thick iron plate or a hot pebble is used, as compared with the temperature control in the conventional griddle using the plate with a thickness of 1 cm.

FIG. 6 shows the quantity of heat $\int W(i)dt$ consumed in cooking the meat in the above-mentioned manner. Since a small quantity of heat is consumed in the auxiliary heating and the portion bearing the meat is principally heated in this example, the total quantity of consumed heat is as small as 564 kJ, which is smaller than 697 kJ, that is, the total heat quantity consumed in the griddle of the first example.

Figure 7:
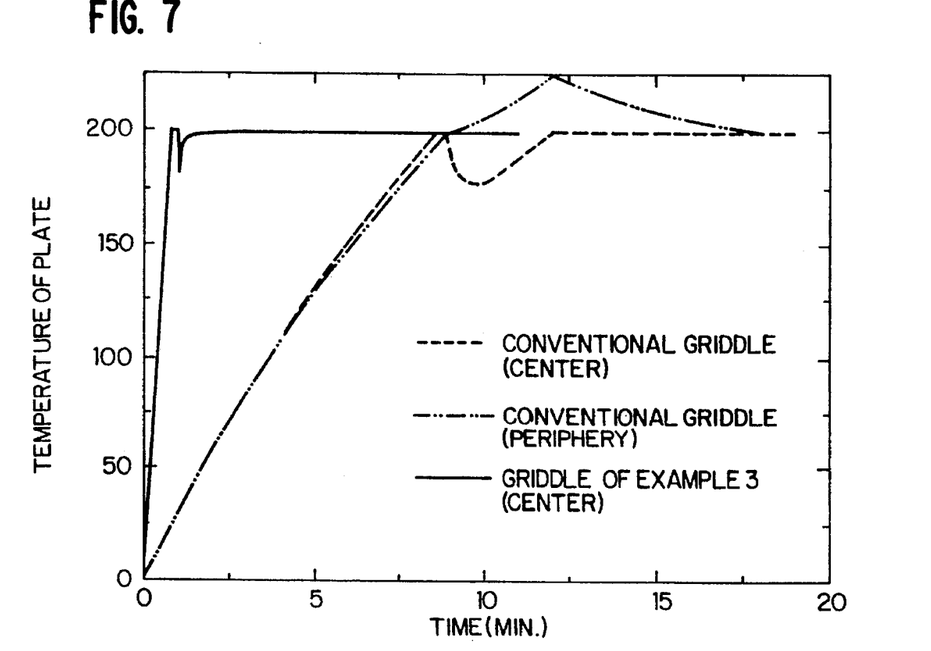
FIG. 7 is a graph showing the change with time in the temperature of a plate in a griddle of the third example.
Figure 8:
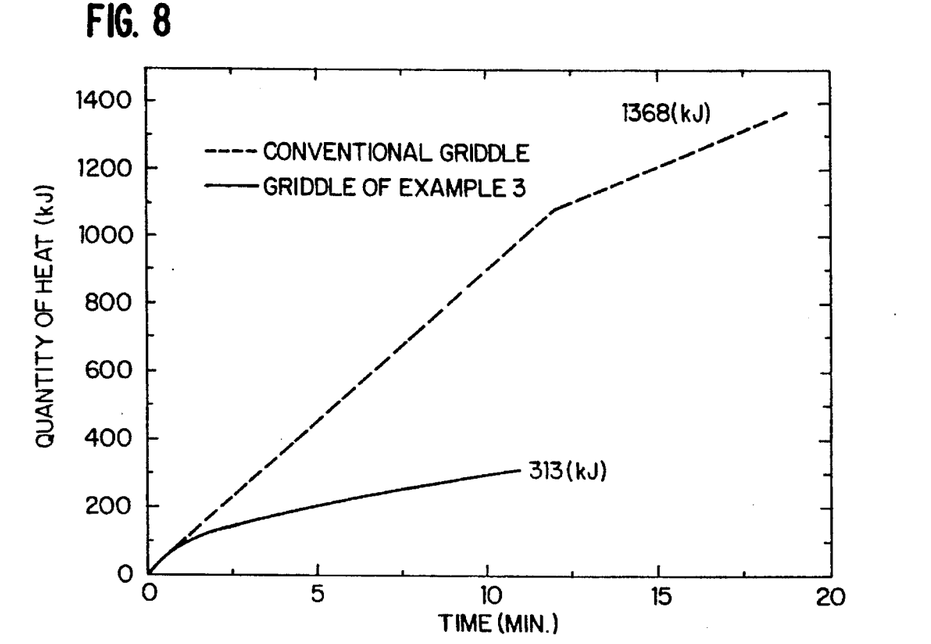
FIG. 8 is a graph showing the quantity of heat consumed in the griddle of the third example.

The third example of this invention will now be described referring to FIGS. 7 and 8. FIG. 7 shows the change with time in the temperature at the center of a plate used in this example. FIG. 8 shows the quantity of heat consumed with time.

A griddle of this example has the same configuration as that of the second example except for the power distribution means 11. The power distribution means 11 of this example determines power to be distributed to the respective heating means 9 by using the regulation of Equation 4 below based on the outputs from the plural temperature sensors 10, the output from the temperature adjustment means 1 and the quantity of previously distributed power.

Equation 4:

In the auxiliary heating,
$$W(i) = a \ (T_{cook} - T_{measure}(i))$$
$$\quad \quad \quad (\text{when } T_{cook} > T_{measure}(i))$$
$$= 0 \quad (\text{when } T_{cook} <= T_{measure}(i)) \quad (a)$$

If $W_{total} = \Sigma_i W(i) > W_{max}$, perform a conversion of $W(i) = \dfrac{W_{max}}{W_{total}} \ W(i)$ (b)

In the heating of a material, $$Ex(i) = b(T_{pretime\_measure}(i) - T_{measure}(i)) + W_{pretime}(i) - W_{th}(i, T_{pretime\_measure}(i)) \quad (c)$$

If $Ex(i) > 0$, $W(i) = 0$

If $Ex(i) <= 0$, $$W(i) = a \ (T_{cook} - T_{measure}(i))$$
$$\quad \quad \quad (\text{when } T_{cook} > T_{measure}(i))$$
$$= 0 \quad (\text{when } T_{cook} <= T_{measure}(i)) \quad (a)$$

wherein Ex(i) indicates an evaluation function for determining the presence of a material, indicating the absence when positive and the presence when negative; $W_{th}(i, T_{pretime-measure}(i))$ indicates the quantity of heat required for maintaining the temperature $T_{pretime-measure}(i)$ of a portion bearing no material at a predetermined temperature; $W_{max}$ indicates the maximum power of the griddle; and a and b have proper positive values.

In the auxiliary heating without placing the meat, the power distribution means 11 supplies distributed power W(i) to each of the heating means 9 by using the regulation of Equation 3 as in the second example.

When the meat is placed on the thin plate 2, the power distribution means 11 detects the presence and the position of the meat by using a material identification circuit (i.e., Equation 4(c)) based on the outputs from the respective temperature sensors 10, the output from the temperature adjustment means 1 and the quantity of previously distributed power, and determines distributed power W(i) to be supplied to each of the heating means 9.

As is shown in FIG. 7, the temperature at the center of the plate is decreased by placing the meat both in the present griddle and the conventional griddle. Then, power is supplied to the heating means 9 so as to raise the temperature of the plate. In the conventional griddle, however, the entire plate is heated, thereby raising the temperature of the periphery of the plate bearing no meat as shown in FIG. 7. This results in waste of heat and insufficient heating of the center of the plate where the meat is placed.

In the present griddle, the material 7 is identified in accordance with Equation 4 and the portion of the thin plate 2 where the material is placed alone is heated. Therefore, the temperature around the center is more rapidly raised up to the cooking temperature $T_{cook}$ even as compared with the griddle of the second example. This means that the temperature is controlled in the griddle of this example in the same manner as in the case where a thick iron plate or a hot pebble is used, as compared with the temperature control in the conventional griddle using the plate with a thickness of 1 cm.

FIG. 8 shows the quantity of heat ∫W(i)dt consumed in cooking the meat in the above-mentioned manner. In the griddle of this example, since a small quantity of heat is consumed in the auxiliary heating and a portion of the plate where the meat is placed alone is heated, only 313 kJ of heat is consumed, which is less than ⅓ of the heat consumed in the conventional griddle and even less than 564 kJ, that is, the heat consumed in the griddle of the third example.

The fourth example of this invention will now be described.

A griddle of this example has the same configuration as that of the third example except for the power distribution means 11. The power distribution means 11 of this example determines distributed power to be supplied to the respective heating means 9 by using the regulation of Equation 5 below based on the outputs from the respective temperature sensors 10, the output from the temperature adjustment means 1 and the quantity of previously distributed power.

Equation 5:

In the auxiliary heating,
$$W(i) = a \ (T_{cook} - T_{measure}(i))$$
$$\quad \quad \quad (\text{when } T_{cook} > T_{measure}(i))$$
$$= 0 \quad (\text{when } T_{cook} <= T_{measure}(i)) \quad (a)$$

If $W_{total} = \Sigma_i W(i) > W_{max}$, perform a conversion of $W(i) = \dfrac{W_{max}}{W_{total}} \ W(i)$ (b)

In the heating of a material, $$Ex(i) = b(T_{pretime\_measure}(i) - T_{measure}(i)) + W_{pretime}(i) - W_{th}(i, T_{pretime\_measure}(i)) \quad (c)$$

$$D(i) = \max \left( e, c \ \dfrac{W_{pretime}(i) - W_{th}(i, T_{pretime\_measure}(i))}{T_{measure}(i) - T_{pretime\_measure}(i)} \right) \quad (d)$$

If $T_{pretime\_measure}(i) = T_{measure}(i)$, $D(i) = e$

If $Ex(i) = 0$, $W(i) = 0$

If $Ex(i) <= 0$, $$W(i) = a \ (T_{cook} - T_{measure}(i))$$
$$\quad \quad \quad (\text{when } T_{cook} > T_{measure}(i))$$
$$= 0 \quad (\text{when } T_{cook} <= T_{measure}(i)) \quad (a)$$

If $W_{total} = \Sigma_i W(i) > W_{max}$, perform a conversion of $W(i) = \dfrac{W_{max}}{W_{total}} \ W(i)$ (b)

wherein Ex(i) indicates an evaluation function for determining the presence of a material, indicating the absence when positive and the presence when negative; D(i) indicates an estimation function for estimating the heat capacity of the material, a larger value indicating a larger heat capacity; $W_{th}(i, T_{pretime-measure}(i))$ indicates the quantity of heat required for maintaining the temperature $T_{pretime-measure}(i)$ of a portion bearing no material at a predetermined temperature; $W_{max}$ indicates the maximum power of the griddle; and a, b, c and e are proper positive values.

In the auxiliary heating without placing a material 7, the power distribution means 11 of this example supplies distributed power W(i) to each of the respective heating means 9 by using the same regulation as that of Equation 3 used in the third example.

When the material 7 is placed on the thin plate 2, the power distribution means 11 detects the presence and the position of the material 7 by using a material identification circuit (i.e., Equation 5(c)) based on the outputs from the respective temperature sensors 10, the output from the temperature adjustment means 1 and the quantity of previously distributed power, and then, estimates the heat capacity of the material 7 by using a heat capacity estimation circuit (i.e., Equation 5(d)). Then, the power distribution means 11 determines distributed power W(i) to be supplied to each of the heating means 9 so as to distribute larger power to heat a material with a larger heat capacity. In this manner, heat can be concentrated on a material having a large heat capacity such as meat more effectively than in the third example. As a result, the temperature of the portion where the material is placed can be rapidly raised. Moreover, it is possible to supply adequate heat to tofu having a large heat capacity and vegetables having a small heat capacity, respectively. Therefore, the griddle of this example can be applied to serve, for example, sukiyaki where these materials are cooked simultaneously.

Figure 9:
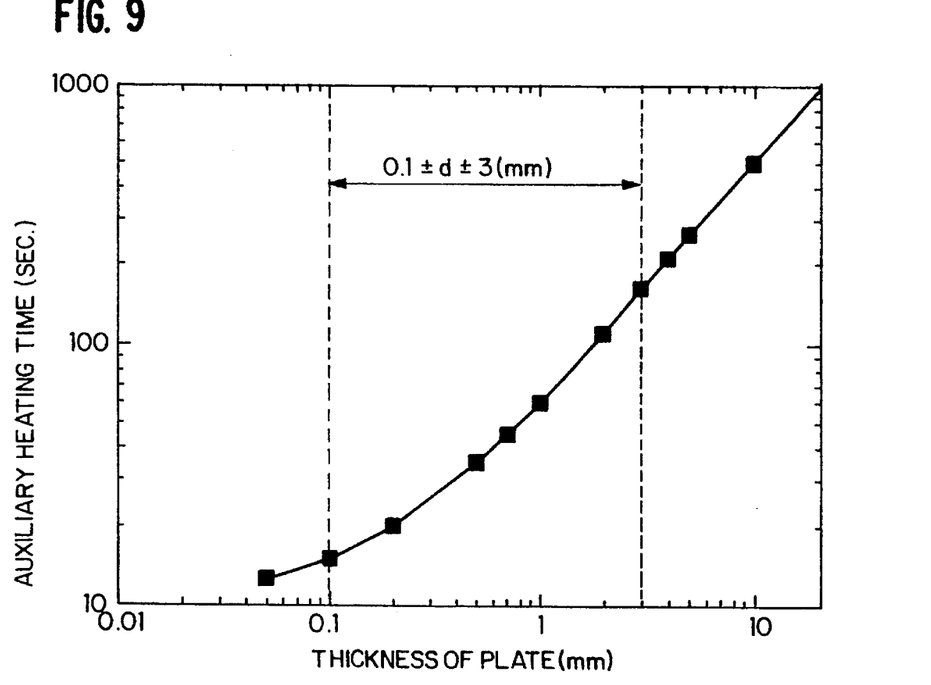
FIG. 9 is a graph showing the relationship between the thickness of a plate and the time required for the auxiliary heating in the griddle of this invention.

In the above description, the thin plate 2 has a thickness of 1 mm. Hereinafter, the relationship among the thickness, time required for the auxiliary heating, the power to be consumed and the weight of the griddle will be studied by using plates with various thickness. FIG. 9 shows the relationship between the thickness of the plate and the auxiliary heating time. An average limit for a person to await for something without becoming irritated is generally regarded to be three minutes. According to the present invention, the auxiliary heating of the thin plate 2 can be finished within three minutes when it is supported by an adiabatic structure and has a thickness of 3 mm or less. A thinner plate requires a shorter time for the auxiliary heating, resulting in decreasing the power to be consumed. Further, a thinner plate makes the entire griddle lighter. When the thickness of the thin plate 2 becomes too small, however, the thin plate 2 can be warped with ease, resulting in degradation in the mechanical strength. Therefore, it is preferable that the lower limit of the thickness of the plate is 0.1 mm.

Figure 10:
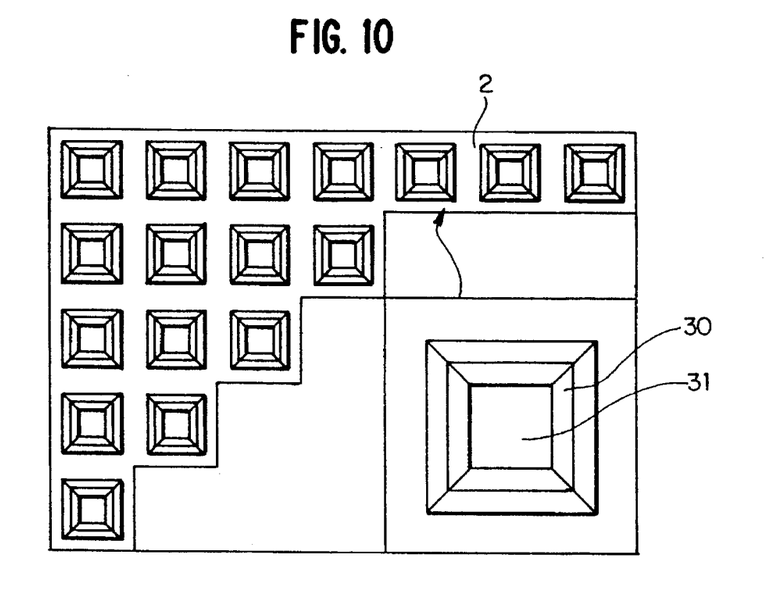
FIG. 10 is a view of a plate having a resistance heater paired with a temperature sensor applicable to the present griddle.

Further, in the above description, the heating means 4 or 9 adopts the electromagnetic heating system. The same effect can be attained by a heater resistance heating system using a heater resistance 30 as shown in FIG. 10 as far as an adiabatic structure is used. Also, the same effect can be attained by a lamp heating system (not shown) by using a halogen lamp.

Also in the above description, the temperature of the thin plate 2 is measured through a contact with the thin plate 2. When a temperature detector formed on the surface of the thin plate 2 through adhesion or evaporation is used as a temperature sensor 31 as shown in FIG. 10, the contact area between the thin plate 2 and the adiabatic frame 3 can be made small, resulting in constituting the adiabatic structure with more ease. Thus, the effect of the adiabatic structure can be exhibited more effectively.

Furthermore, when the temperature of the thin plate 2 is detected by measuring the resistance of a heater resistance 30 formed on the thin plate 2 as shown in FIG. 10, no temperature sensor is required, resulting in a simplified configuration to obtain the same effect.

The material identification circuit for detecting the presence of a material and the heat capacity estimation circuit for estimating the heat capacity of the material used in the power distribution means 11 are not limited to Equations 4 and 5, and can be any equation that can detect the existence and estimating the heat capacity of the material based on the quantity of previously distributed power, the temperature of the thin plate, the geometrical structure of the griddle and the ability of the heating means.

As is apparent from the above description, the griddle of this invention can be ready for cooking in three minutes owing to a thin plate supported by an adiabatic structure. Further, the present griddle consumes less power and is small in weight.

Moreover, since a number of heating means and temperature sensors are used so as to supply larger heat to a portion where the temperature is largely decreased, it is possible to cook various materials under the same temperature conditions as in cuisine cooked by using a thick plate or a hot pebble.

In addition, in the present griddle, the existence of a material is detected and a portion of the plate where the material is placed is principally heated. Therefore, the food cooked with the present griddle can be more similar to cuisine cooked by using a thick plate or a hot pebble. Further, less power is required.

Because of these effects of the present invention, a compact and light griddle of this invention can serve cuisine quickly, simply and consumes a small power. As a result, the griddle also serves the pleasures of a happy family.

What is claimed is:

1. A griddle comprising:

temperature adjustment means for adjusting a cooking temperature for a material such as meat and vegetables;

a thin plate having a small heat capacity for heating the material through heat conduction;

an adiabatic frame for supporting said thin plate with an adiabatic structure;

plurality of heating means for heating said thin plate;

a plurality of temperature sensors for respectively measuring temperatures of a plurality of positions on said thin plate and outputting the measured temperatures;

power distribution means for determining power to be distributed to each of said heating means based on the measured temperatures outputted from said temperature sensors and the cooking temperature adjusted by said temperature adjustment means.

2. A griddle according to claim 1, wherein said thin plate has a thickness of 0.1 mm or more and 3 mm or less.

3. A griddle according to claim 1, wherein said power distribution means comprises:

a power input distribution circuit for distributing power to be supplied to each of said heating means in accordance with a difference between the cooking temperature and each of the measured temperatures; and a maximum power limit circuit for limiting total power to be supplied to said heating means so as not to exceed a maximum power of said griddle.

4. A griddle according to claim 2, wherein said power distribution means comprises:

a power input distribution circuit for distributing power to be supplied to each of said heating means in accordance with a difference between the cooking temperature and each of the measured temperatures; and a maximum power limit circuit for limiting total power to be supplied to said heating means so as not to exceed a maximum power of said griddle.

5. A griddle according to claim 3, wherein said power distribution means further comprises:

a material identification circuit for detecting the presence of the material based on the measured temperatures and a quantity of previously supplied power, and when said material is detected on a certain area on said thin plate, said power distribution means stops supplying power to an area other than the certain area.

6. A griddle according to claim 4, wherein said power distribution means further comprises:

a material identification circuit for detecting presence of the material based on the measured temperatures and a quantity of previously supplied power, and when said material is detected on a certain area on said thin plate, said power distribution means stops supplying power to an area other than the certain area.

7. A griddle according to claim 3, wherein said power distribution means further comprises:

a heat capacity estimation circuit for estimating a heat capacity of the material based on the measured temperatures and a quantity of previously supplied power, and said power distribution means distributes power to each of said heating means in proportion to the heat capacity of the material.

8. A griddle according to claim 4, wherein said power distribution means further comprises:

a heat capacity estimation circuit for estimating a heat capacity of the material based on the measured temperatures and a quantity of previously supplied power, and said power distribution means distributes power to each of said heating means in proportion to the heat capacity of the material.

9. A griddle according to claim 5, wherein said power distribution means further comprises:

a heat capacity estimation circuit for estimating a heat capacity of the material based on the measured temperatures and a quantity of previously supplied power, and said power distribution means distributes power to each of said heating means in proportion to the heat capacity of the material.

10. A griddle according to claim 6, wherein said power distribution means further comprises:

a heat capacity estimation circuit for estimating a heat capacity of the material based on the measured temperatures and a quantity of previously supplied power, and said power distribution means distributes power to each of said heating means in proportion to the heat capacity of the material.

11. A griddle according to claim 1, wherein said plurality of heating means and said plurality of temperature sensors correspond to each other with regard to their positions.

12. A griddle according to claim 2, wherein said plurality of heating means and said plurality of temperature sensors correspond to each other with regard to their positions.

13. A griddle according to claim 3, wherein said plurality of heating means and said plurality of temperature sensors correspond to each other with regard to their positions.

14. A griddle according to claim 4, wherein said plurality of heating means and said plurality of temperature sensors correspond to each other with regard to their positions.

15. A griddle according to claim 5, wherein said plurality of heating means and said plurality of temperature sensors correspond to each other with regard to their positions.

* * * * *